June 19, 1951     W. F. DOUBLE     2,557,082
REAR DUMP TRUCK
Original Filed June 5, 1947     3 Sheets-Sheet 1
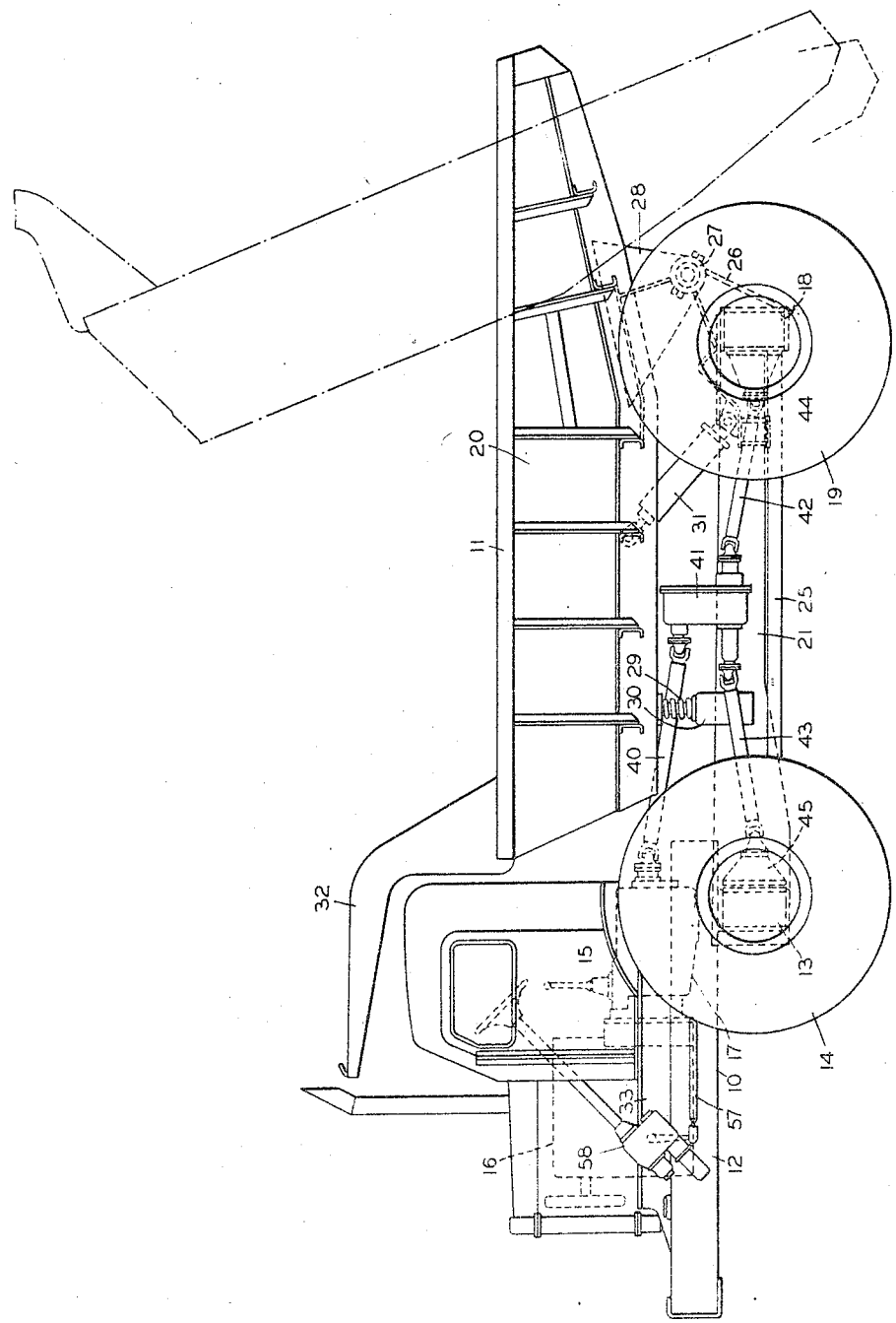
INVENTOR
WALTER F. DOUBLE
BY *Hyde, Meyer, Baldwin & Doran*
ATTORNEYS

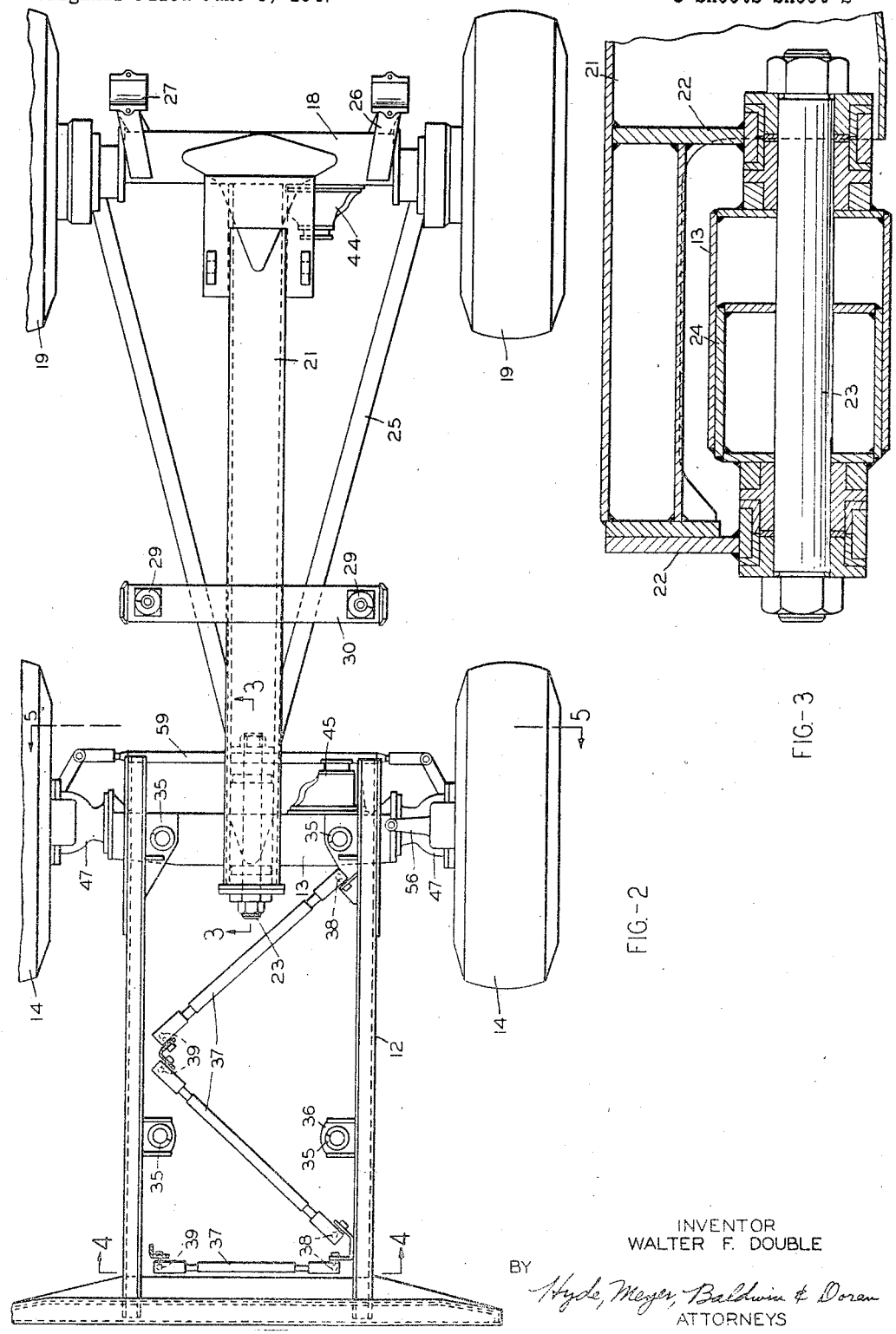

INVENTOR
WALTER F. DOUBLE
BY *Hyde, Meyer, Baldwin & Doran*
ATTORNEYS

Patented June 19, 1951

2,557,082

UNITED STATES PATENT OFFICE 2,557,082

REAR DUMP TRUCK

Walter F. Double, Wickliffe, Ohio, assignor to The Euclid Road Machinery Co., Cleveland, Ohio, a corporation of Ohio Original application June 5, 1947, Serial No. 752,626. Divided and this application April 1, 1948, Serial No. 18,319

3 Claims. (Cl. 298—17)

This invention relates to off-the-road vehicles, such as are used in moving earth or other materials.

This application is a division of my copending application, Serial No. 752,626, filed June 5, 1947.

One object of the invention is to provide an improved truck embodying a power unit including cab and engine mounted directly upon and movable with the front axle, and a load-carrying unit including the dump body and a chassis mounted upon the rear axle, the two units being coupled by a trunnion joint permitting relative motion between them, thus avoiding torsional strains or stresses when traveling over rough terrain.

Another object is to simplify and improve the load-carrying unit by including with or as a part of its rear axle housing both the supports for the tilting body and a longitudinally extending reach rod of truss form strengthened by diagonal braces.

A further object is to provide an improved two unit truck assembly of the kind described, including four wheel drive, the latter embodying planetary drive through a constant velocity universal joint in or connected to the steering axle.

Another object is to provide an improved motor vehicle, including propelling drive through the steering wheels, in which the propelling mechanism, beyond the universal joint, includes speed reducing mechanism, and in a more specific sense, speed reducing mechanism of planetary type, thus permitting the use of a small and compact universal joint by reason of its relatively high speed operation.

Still another object is to provide propelling mechanism for the steering wheels, including a universal joint and planetary gearing, on or in the wheel, operated thereby, in which the sun gear shaft floats freely at its driving end and thus is self-accommodating to the surrounding planet gears.

Another object is to improve the mounting for the cab and engine of the power unit by supporting them upon a sub-frame yieldingly mounted upon the front axle but yet confined in such manner as to prevent or avoid side or fore and aft sway or relative horizontal motion.

Still another object is to generally improve all of the mechanism for the purpose of providing a rugged, durable construction, well able to withstand the wear and tear of transport of all kinds of material over all types of terrain, and under various rough ground or weather conditions, and useful on all lengths of haul.

Further objects of the invention in part are obvious and in part will appear more in detail hereinafter.

In the drawings, which illustrate one suitable embodiment of the invention, Fig. 1 is a side elevation, the dot-dash lines illustrating the body in ordinary dumping position and the dotted lines in extreme dumping position;

Fig. 2 is a plan view, the load-carrying body being omitted;

Fig. 3 is a sectional elevation on the line 3—3, Fig. 2;

Figure 4:
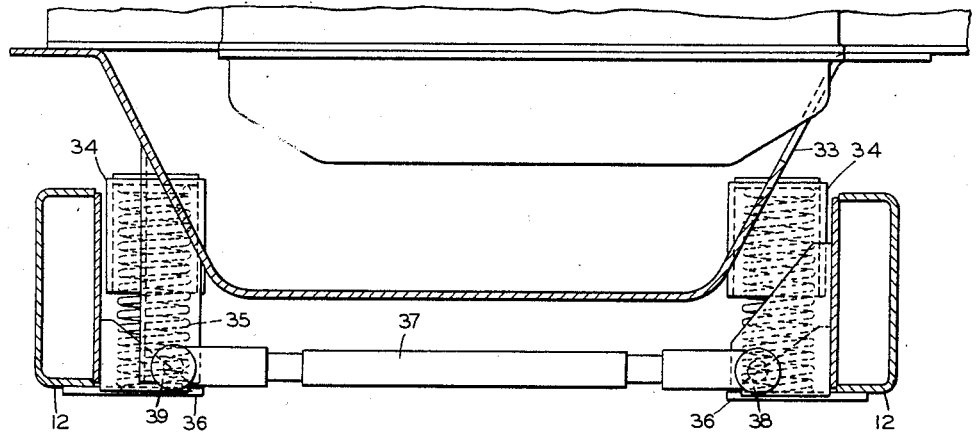
Fig. 4 is a detail section, on a larger scale, on the line 4—4, Fig. 2.

Referring first to Fig. 1, the dump truck shown in the drawings consists of the two units before referred to, to wit, a power unit marked generally 10 and a load-carrying unit marked generally 11 connected together in such manner as to provide relative motion between them so that the four wheels are self-accommodating to rough terrain without production of torsional strains or stresses. The power unit includes a hollow rectangular frame 12, made of structural steel members rigidly connected together and mounted upon the housing 13 for the front or steering axle provided with front wheels 14. On this frame are supported the usual cab 15, a power motor, such as the usual internal combustion engine 16, and conventional change speed mechanism indicated in dotted lines at 17. The load-carrying unit includes a supporting frame, later described in detail, supported upon the housing 18 of the rear axle provided with wheels 19, the frame of this member being provided with a load-carrying body 20. The load-carrying unit will be described first.

The frame of this unit is in the form of a reach rod or member 21, shown as a hollow tubular member, made of structural steel shapes rigidly connected together, said reach member being rigidly secured at its rear end, as by welding, to the housing 18. At its front end said member is provided with rigidly connected depending ears 22 (Fig. 3) spaced apart and lying in parallel planes and journalled in any suitable manner to turn about a longitudinal axis on the shaft 23, which is mounted in a boxlike portion 24 of or attached to the front axle housing. It will be noted in Fig. 3 that parts rigidly attached to ears 22 abut against parts rigidly attached to front axle housing 13 so that any thrust on beam 21 is transmitted to axle housing 13. Diagonal braces 25 contribute strength and rigidity to the frame. On brackets 26 integral with or welded to the rear axle housing 18 are mounted sleeves 27 to receive pivot pins supporting the load-carrying body 20 by means of depending body brackets 28. The body is of the usual shallow tray form with its floor partly horizontal and partly inclined, and surrounded by side and end walls forming a container in which dirt to be moved may be deposited. This body normally occupies the position shown in full lines, Fig. 1, its forward end resting upon and supported by compression springs 29 mounted upon the ends of a cross beam 30. For dumping a load it may be tilted to or toward the regular dumping position shown in dot-dash lines, Fig. 1, for which purpose suitable jack devices may be provided, such as one or two (one on each side) fluid pressure servo-motors 31, preferably double-acting and actuated by fluid pressure, either air or oil, from any suitable source of pressure, such as a reservoir supplied by a pump (not shown) in the usual manner.

Under certain conditions the truck may be employed as a bulldozer for distributing a pile of earth or other material over an area. The truck is suitable for that purpose because, as will later appear, it embodies four wheel drive, and the body may be tilted to an extreme dumping position, shown in dotted lines, Fig. 1, with the extreme rear end of the body close to the ground level, say within the range of two or three inches therefrom. For bulldozer use, the jack 31 should be oil-operated and double-acting, to positively lock or hold the body in the bulldozing position.

By operating the truck in reverse gear the tilted body serves as a ram by means of which a pile of earth may be spread or distributed. During such action the side walls of the body prevent lateral spread of the earth so that it forms a reservoir or container in which the earth piles up as the ram body is shoved across the pile, thus assisting in distribution of the earth over a considerable range. The shock or strain of bulldozing operations is directly transmitted to the rear axle and through the frame reach bar 21 to the front axle at a relatively low level, usually below the top of a pile so that bulldozing operations properly distribute the strains and stresses without undue torsional or bending effects. Further, the pivotal or rocking mounting of the forward end of the reach bar on the front axle permits the load-carrying unit, as a whole, to tilt or turn to one side or the other about the longitudinal axis of shaft 23, or the power unit to so tilt with reference to the load-carrying unit, enabling the truck as a whole to readily accommodate itself to inequalities or unevenness on rough terrain without the production of torsional strain or stresses.

The body 20 may be provided with a canopy 32 extending over and protecting the cab when the body is in horizontal or loading position, although this is not essential.

Figure 5:
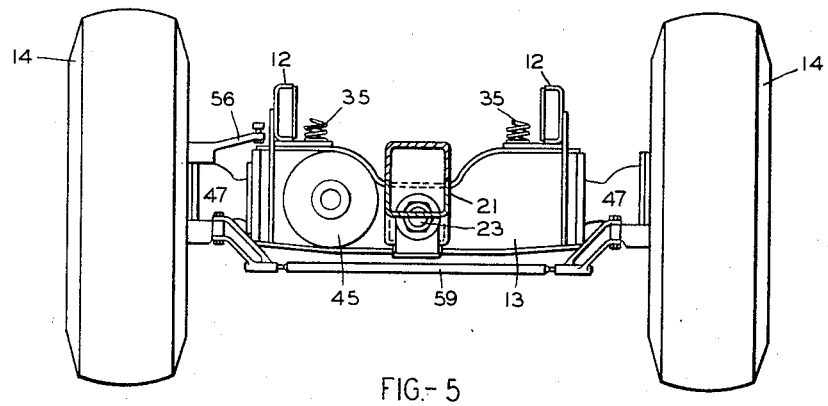
Fig. 5 is a sectional elevation on the line 5—5, Fig. 2.

The cab 15, engine 16 and transmission 17 are all mounted upon a sub-frame marked generally 33, Fig. 5. At the four corners of the sub-frame it is provided with inverted cup-shaped housings 34, each capping, surrounding and resting upon the upper end of a main frame 12. Thus the cab and engine members are yieldingly mounted upon the main power unit frame, so that the truck is easy riding. To permit relative vertical motion between the main and sub-frame members of the power unit, but prevent relative lateral motion and possible escape of one member from the other, I provide several sway braces 37, one extending laterally and two diagonally (Figs. 2 and 5), each pivotally connected at one end, by a ball joint, as at 38, to the main frame and its opposite end, by a similar joint, as at 39, to the sub-frame.

As before stated, the truck is provided with four wheel drive. Power is taken off from the change speed mechanism 17, by way of shaft 40 to a gear box 41, mounted upon the frame of the load-carrying unit. From this gear box powder is taken off by way of shafts 42 and 43. Shaft 42 drives conventional differential mechanism, indicated at 44, for the rear axle. Shaft 43 operates differential mechanism, indicated at 45, for driving propelling shafts, one for each of the two front wheels. Other details of the drive will be found in my copending application mentioned above.

The wheel frame 47, or a part connected thereto, of course is provided with an operating arm 56 (Fig. 2) actuated by a link 57 connected to the usual steering mechanism, marked generally 58, and the two steering wheels are cross connected, for joint operation, by the usual cross bar or link 59.

The truck as a whole is rugged and durable and may be satisfactorily employed for a variety of purposes. It may be used either for load-carrying purposes, or, usually in reverse gear, for bulldozing operations, and in either case is self-accommodating to rough terrain without the production of harmful torsional strains and stresses. The cab, engine and change speed mechanism are yieldingly mounted so that the vehicle is easy riding, but are so mounted as to prevent side sway or escape from the main frame of the power unit. Four wheel drive makes the vehicle very powerful, the drive mechanism being of such form as to reduce wear and tear and deliver power to the wheels with maximum efficiency.

Other advantages of the invention will be apparent to those skilled in the art.

What I claim is:

1. A rear dump truck comprising rigid front and rear frames, front and rear axles associated with their respective frames and each having wheel means for supporting its associated frame, a rear dump body, a pivotal connection mounting said rear body directly on said frame for oscillation about a pivotal axis extending crosswise of said truck, said body extending rearwardly beyond said axis a distance approximating the height of said axis above ground level, means for tilting said body to and for holding said body in position with its rear end close to the ground wherein said body is sufficiently close to a vertical position to act as a bulldozer when pushed backwardly, means for driving said truck backwardly, said front axle having a housing, and a trunnion connection between said rear frame and the mid-portion of said front axle housing, whereby said body may be used for bulldozing and said front axle may accommodate itself to rough ground.

2. The combination of claim 3 wherein said rear axle has a housing, said pivotal connection between said body and frame is mounted on said rear axle housing, and said trunnion connection is at the front end of a reach beam rigidly connected to the mid-portion of said rear axle housing and extending substantially horizontally forwardly therefrom, whereby the strain of bulldozing is transmitted to the front axle housing also.

3. A rear dump truck comprising a front frame, a front axle housing rigidly connected with said frame, a front axle in said housing, wheel means on said housing and having a driving connection with said axle, a rear frame, a rear axle housing rigidly connected with said rear frame, a rear axle in said rear axle housing, wheel means on said rear axle housing and having a driving connection with said rear axle, a rear dump body, a pivotal connection mounting said body directly on said rear axle housing for oscillation about a pivotal axis extending crosswise of said truck, said body extending rearwardly beyond said axis a distance approximating the height of said axis above ground level, said frame being free of obstructions to body oscillation in rear of and below said pivotal connection, means for tilting said body to and for holding said body in a position with its rear end close to the ground wherein said body is sufficiently close to a vertical position to act as a bulldozer when pushed backwardly, drive means connected to said front and rear axles for driving said truck forward and backward, said rear frame having a rigid beam construction rigidly connected with said rear axle housing and extending forwardly therefrom, said rigid beam construction having parts abutting rigid parts of said front axle housing for transmitting thrust in a fore-and-aft direction and a pivot connection between the forward end of said rigid beam construction and said front axle housing and having a pivotal axis extending in a fore-and-aft direction, whereby said body may be used efficiently for bulldozing while transmitting the strain at the rear of the truck to said front axle housing and while permitting said front axle to accommodate itself to rough ground.

WALTER F. DOUBLE.

REFERENCES CITED

The following references are of record in the file of this patent:

UNITED STATES PATENTS

| Number | Name | Date |
|---|---|---|
| 515,266 | Underwood et al. | Feb. 20, 1894 |
| 1,773,496 | Osman | Aug. 19, 1930 |
| 2,350,488 | Barrett | June 6, 1940 |
| 2,326,594 | Wood | Aug. 10, 1943 |
| 2,368,202 | Clark | Jan. 30, 1945 |
| 2,425,953 | Rogers | Aug. 19, 1947 |

FOREIGN PATENTS

| Number | Country | Date |
|---|---|---|
| 788,966 | France | of 1935 |